United States Patent
Ours et al.

(10) Patent No.: US 6,979,166 B2
(45) Date of Patent: Dec. 27, 2005

(54) VACUUM WAND ASSEMBLY FOR EXTRACTING A PRODUCT FROM A CONTAINER

(75) Inventors: David C. Ours, Marshall, MI (US); Randall L. Cary, Battle Creek, MI (US); Gary Gunia, Portage, MI (US)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 10/844,793

(22) Filed: May 13, 2004

(65) Prior Publication Data

US 2004/0228693 A1    Nov. 18, 2004

Related U.S. Application Data

(60) Provisional application No. 60/470,794, filed on May 15, 2003.

(51) Int. Cl.[7] .............................................. B65B 21/02
(52) U.S. Cl. ...................... 414/403; 406/114; 406/141; 406/145; 406/151
(58) Field of Search ........................ 406/114, 141, 145, 406/151, 153; 414/403

(56) References Cited

U.S. PATENT DOCUMENTS

| | | | |
|---|---|---|---|
| 3,374,599 A | 3/1968 | Sanders | |
| 3,570,749 A | 3/1971 | Sato | |
| 3,906,591 A | 9/1975 | Bolardi | |
| 3,943,988 A | 3/1976 | Consorti | |
| 3,951,462 A | * | 4/1976 | De Francisci ............... 406/114 |
| 4,113,146 A | 9/1978 | Williamson | |
| 4,136,501 A | 1/1979 | Connolly | |
| 4,223,061 A | 9/1980 | Michaels | |
| 4,253,507 A | 3/1981 | Williamson | |
| 4,299,076 A | 11/1981 | Humphrey | |
| 4,339,040 A | 7/1982 | Peil et al. | |
| 4,546,593 A | 10/1985 | Lasscock | |
| 4,781,475 A | 11/1988 | LaFleur | |
| 5,025,925 A | 6/1991 | Wiklund | |
| 5,125,785 A | * | 6/1992 | Langen et al. ......... 414/416.01 |
| 5,353,936 A | 10/1994 | Dockstader et al. | |
| 5,382,117 A | * | 1/1995 | Rings et al. ................... 406/39 |
| 5,474,111 A | 12/1995 | Williamson et al. | |
| 5,544,472 A | 8/1996 | Koskinen | |
| 5,566,530 A | 10/1996 | Johnstone et al. | |
| 5,787,945 A | 8/1998 | Riemersma | |

(Continued)

FOREIGN PATENT DOCUMENTS

DE    41 24 911 A1    1/1993

(Continued)

*Primary Examiner*—Joe Dillon, Jr.
(74) *Attorney, Agent, or Firm*—Howard & Howard

(57) ABSTRACT

The subject invention relates to a vacuum wand assembly for extracting a product from a container, especially a non-self supporting container that collapses as the product is extracted. The assembly includes a wand for extending into the container and for withdrawing the product therefrom. A vacuum source is connected to the wand for applying a vacuum to extract the product through the wand. A supporting structure supports the wand and is moveable relative to the container for carrying the wand as the product is extracted from the container. The wand is limited in a vertical direction by the supporting structure. This keeps the wand at the pre-determined level relative to the product within the container.

24 Claims, 5 Drawing Sheets

U.S. PATENT DOCUMENTS

| | | | |
|---|---|---|---|
| 5,944,455 A | 8/1999 | Wilhelm | |
| 5,967,579 A | 10/1999 | Herbert | |
| 6,012,266 A * | 1/2000 | Koskinen et al. | 53/399 |
| 6,036,408 A * | 3/2000 | Wilhelm et al. | 406/113 |
| 6,494,324 B2 | 12/2002 | Ours et al. | |
| 6,843,283 B2 * | 1/2005 | Dietrich | 141/10 |
| 2001/0008567 A1 | 7/2001 | Burkhardt | |

FOREIGN PATENT DOCUMENTS

| | | |
|---|---|---|
| EP | 0 765 829 A1 | 4/1997 |
| EP | 0 922 640 A1 | 6/1999 |
| EP | 0 943 560 A1 | 9/1999 |

* cited by examiner

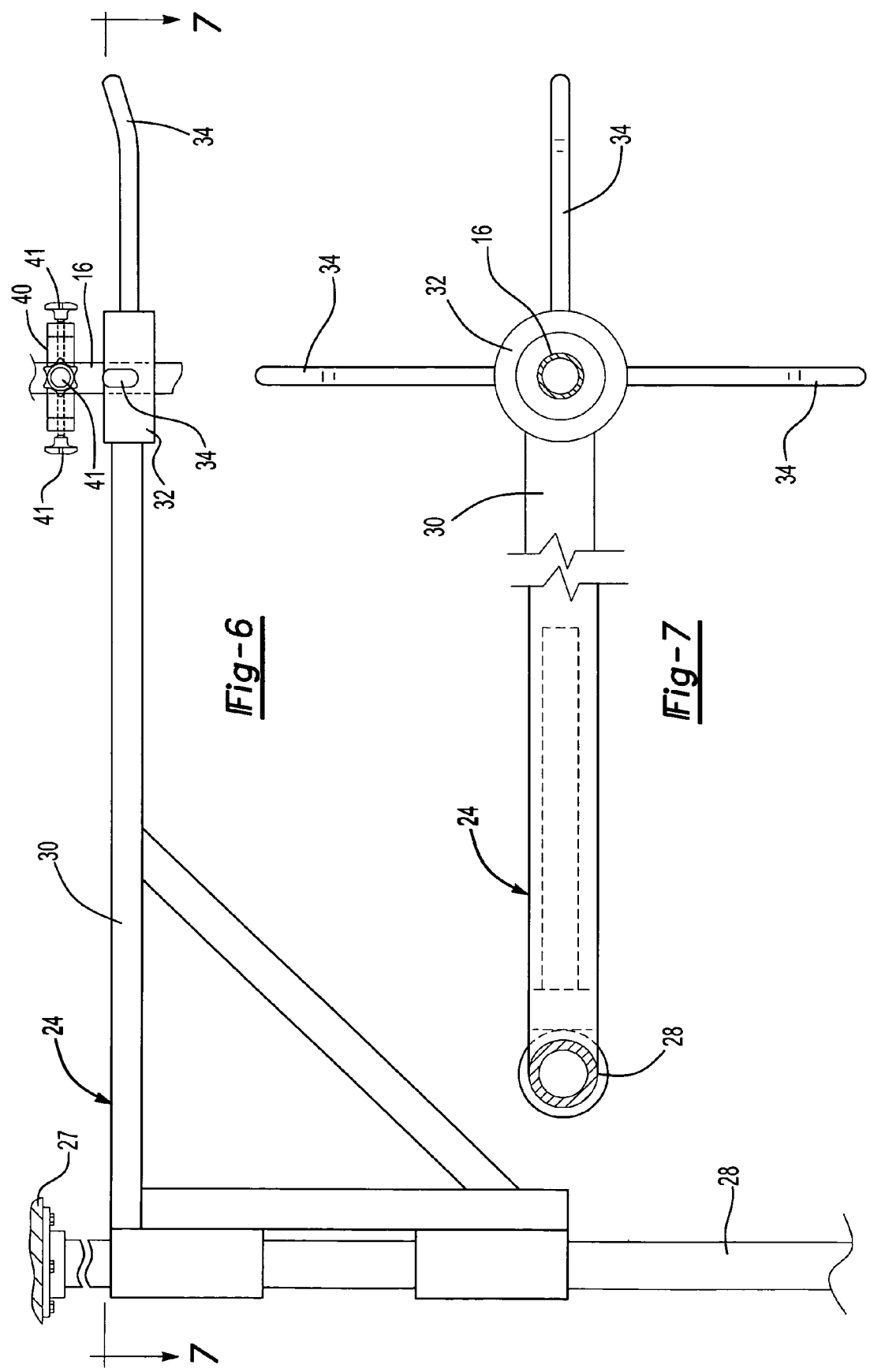

VACUUM WAND ASSEMBLY FOR EXTRACTING A PRODUCT FROM A CONTAINER

CROSS-REFERENCE TO RELATED APPLICATIONS

This application claims priority to provisional patent application 60/470,794 which was filed May 15, 2003.

BACKGROUND OF THE INVENTION

1) Field of the Invention

The subject invention relates to a vacuum wand assembly for extracting a product from a container, and more specifically, from a non-self supporting container.

2) Description of Related Art

Various containers are known to those skilled in the art for shipping a product, especially a particulate fill material. Such containers include large rectangular crates, or boxes, and woven sacks having an opening on the top. Once these containers reach their destination, it is necessary to extract the product from within the container. The crates are typically rotated and inverted and the product falls from the container. The woven sacks, typically called "Super Sacs" which are large canvas type bags, have a drawstring top, or similar, that can be opened and then the sack is inverted and product falls from the sack. Other non-self supporting containers are disclosed in U.S. Pat. No. 6,494,324 assigned to the assignee of the present invention and U.S. Pat. No. 6,012,266. The non-self supporting containers collapse as the product is extracted and have flexible sides. Therefore, it is difficult to invert these containers without the containers collapsing on themselves.

These related art assemblies and methods of extracting product from the containers are characterized by numerous inadequacies. First, dumping the contents from the container typically damages the product as the product falls on itself. If the product is fragile, then a portion of the product will be crushed by the weight of the falling product. Second, unlike the crate that is a self-supporting container, the product within the sack may be damaged when it is grasped and inverted to dump out the contents. Therefore, it would be advantageous to provide an assembly for extracting a product from a container with reduced crushing of the product. It would be further advantageous to provide an assembly for extracting the product from a non-self supporting container without inverting the container or without toppling the container upon itself as the product is extracted.

BRIEF SUMMARY OF THE INVENTION

The subject invention provides a vacuum wand assembly for extracting a product from a container. The assembly includes a wand for extending into the container and for withdrawing the product therefrom and a vacuum source connected to the wand for applying a vacuum to extract the product through the wand. A supporting structure supports the wand and is moveable relative to the container for carrying the wand as the product is extracted from the container.

The subject invention overcomes the inadequacies that characterize the related art methods. Specifically, the subject invention extracts the product under a controlled vacuum which prevents the entire contents of the container from crushing the product as it is removed. Further, the subject invention is particularly suited for extracting product from a non-self supporting container. The supporting structure supports the wand relative to the container and prevents the wand from being drawn into the bottom of the container. This prevents the non-self supporting container from toppling upon itself and crushing the product. Further, the subject invention does not require the non-self supporting container to be inverted to extract the product therefrom.

BRIEF DESCRIPTION OF THE SEVERAL VIEWS OF THE DRAWING

Other advantages of the present invention will be readily appreciated, as the same becomes better understood by reference to the following detailed description when considered in connection with the accompanying drawings wherein:

FIG. 6 is a side view of the supporting structure of the embodiment shown in FIG. 4 having prongs extending therefrom and a collar about the wand; and FIG. 7 is a top view of the supporting structure of FIG. 6.

DETAILED DESCRIPTION OF THE INVENTION

Figure 1:
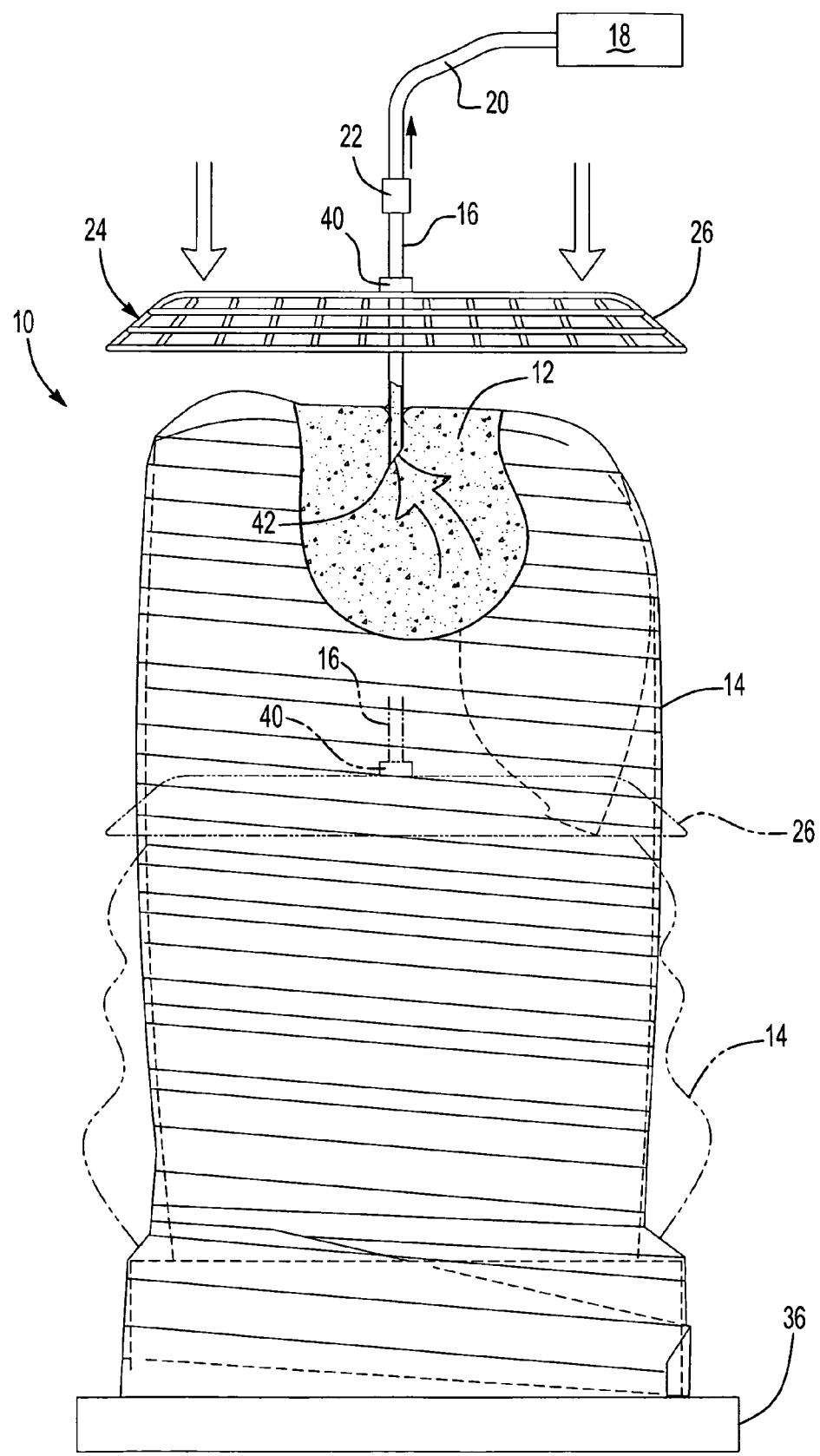
FIG. 1 is a side view of a vacuum wand assembly for extracting a product from a container, the phantom lines illustrate the assembly when approximately half of the product has been removed from the container.

Referring to the Figures, wherein like numerals indicate like or corresponding parts throughout the several views, a vacuum wand assembly for extracting a product 12 from a container 14 is shown generally at 10 in FIG. 1. The assembly 10 is particularly suited for extracting the product 12 from a non-self supporting container 14 that collapses as the product 12 is extracted. An example of a non-self supporting container is disclosed in U.S. Pat. No. 6,494,324 assigned to the assignee of the present invention. Another example of a non-self supporting container can be found in U.S. Pat. No. 6,012,266. A still further example is called "Super Sacs" which are large canvas type bags. The product 12 within the container 14 is typically bulk goods.

These non-self supporting containers 14 collapse as they are emptied. The assembly 10 of the present invention follows the container 14 as it collapses and is held at a pre-determined level with respect to the product 12 in the container 14. It is important to have the assembly 10 properly held with respect to the product 12 within the container 14. The assembly 10 includes a wand 16 for extending into the container 14 and for withdrawing the product 12 therefrom. It has been found that by merely inserting the wand 16, the wand 16 is sucked down into the container 14, creating a cavity at or near the bottom of the container 14 allowing the top of the container 14 to collapse over the bottom. Typically, these containers 14 can contain over 2,000 or more lbs. of product 12, so unwanted collapsing is a problem. What is desired is a controlled vertical collapse with the top staying aligned with the bottom as the container 14 is emptied. This desired controlled vertical collapse can be seen in FIG. 1.

The wand 16 is connected to a vacuum source 18 for applying a vacuum to extract the product 12 through the wand 16. A flexible hose 20 is disposed between the wand 16 and the vacuum source 18 for connecting the wand 16 to the vacuum source 18. A coupler 22 may be used to connect the wand 16 to the hose 20.

Figure 2:
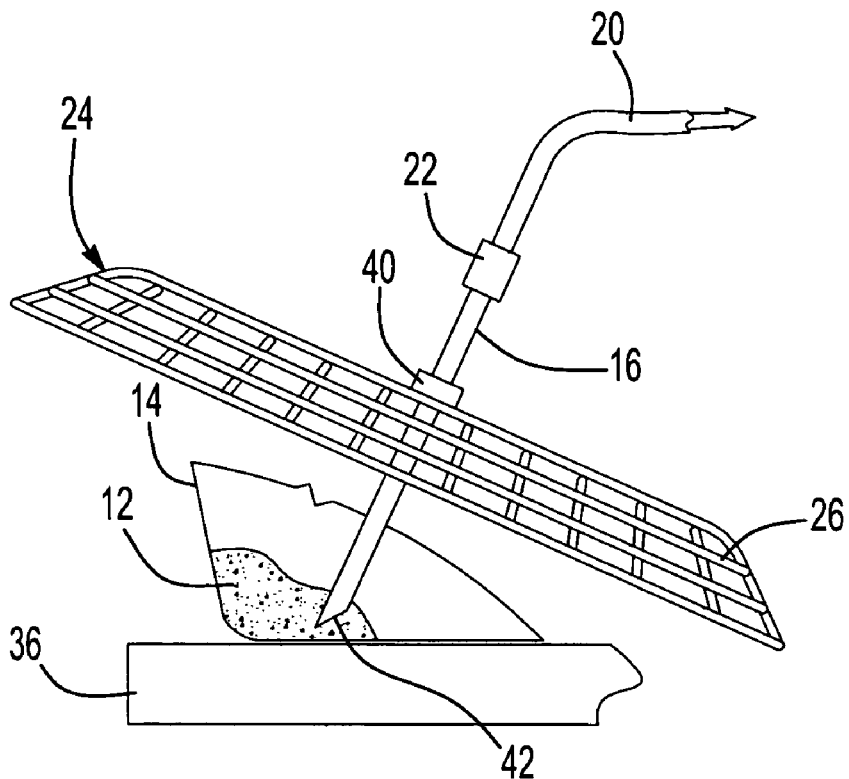
FIG. 2 is a side view of a wand and a supporting structure of the assembly being pivoted to extract product from the container.
Figure 3:
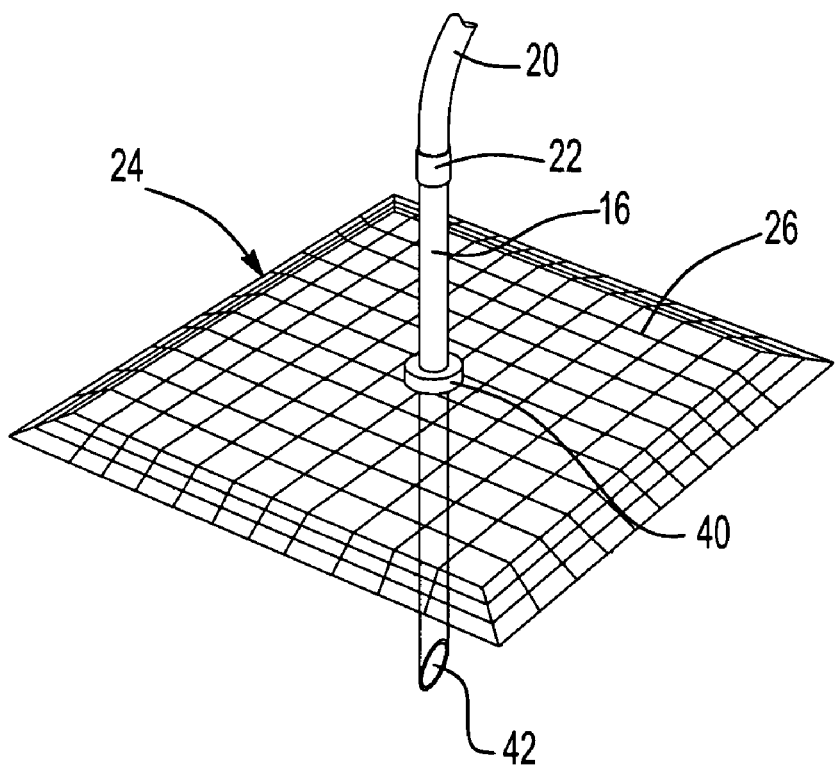
FIG. 3 is a perspective view of the wand and the supporting structure.

A supporting structure is shown generally at 24 and supports the wand 16. The supporting structure 24 is moveable relative to the container 14 for carrying the wand 16 as the product 12 is extracted from the container 14. This keeps the wand 16 at the pre-determined level relative to the product 12 within the container 14. Referring to FIGS. 1–3, the supporting structure 24 is illustrated as a grid 26. The grid 26 may be supported directly on the container 14 or slightly above the container 14. The grid 26 is preferably made from a mesh wire. If should be appreciated that the supporting structure 24 could be made of any type of material and have numerous shapes, including round, triangular, etc. However, the grid 26 should be light enough to not crush the product 12 within the container 14.

In FIG. 2, the grid 26 and the wand 16 are pivoted to extract the remaining product 12 from the container 14. FIG. 3 illustrates a perspective view of the grid 26 and the wand 16.

An alternate embodiment of the supporting structure 24 is illustrated in FIGS. 4–7. In these Figures, a stand 28 is located adjacent the container 14 for supporting the supporting structure 24. The supporting structure 24 slideably engages the stand 28 for moving in a vertical direction as the product 12 is extracted. Preferably, the supporting structure 24 is an arm 30 having a hoop 32 on one end that is larger than the wand 16 for receiving the wand 16 and the other end engages the stand 28. Preferably, the stand 28 is a rod that the arm 30 can travel along in the vertical direction. The vertical travel may be assisted by the use bearings or the like, or may just ride along the rod.

Figure 5:
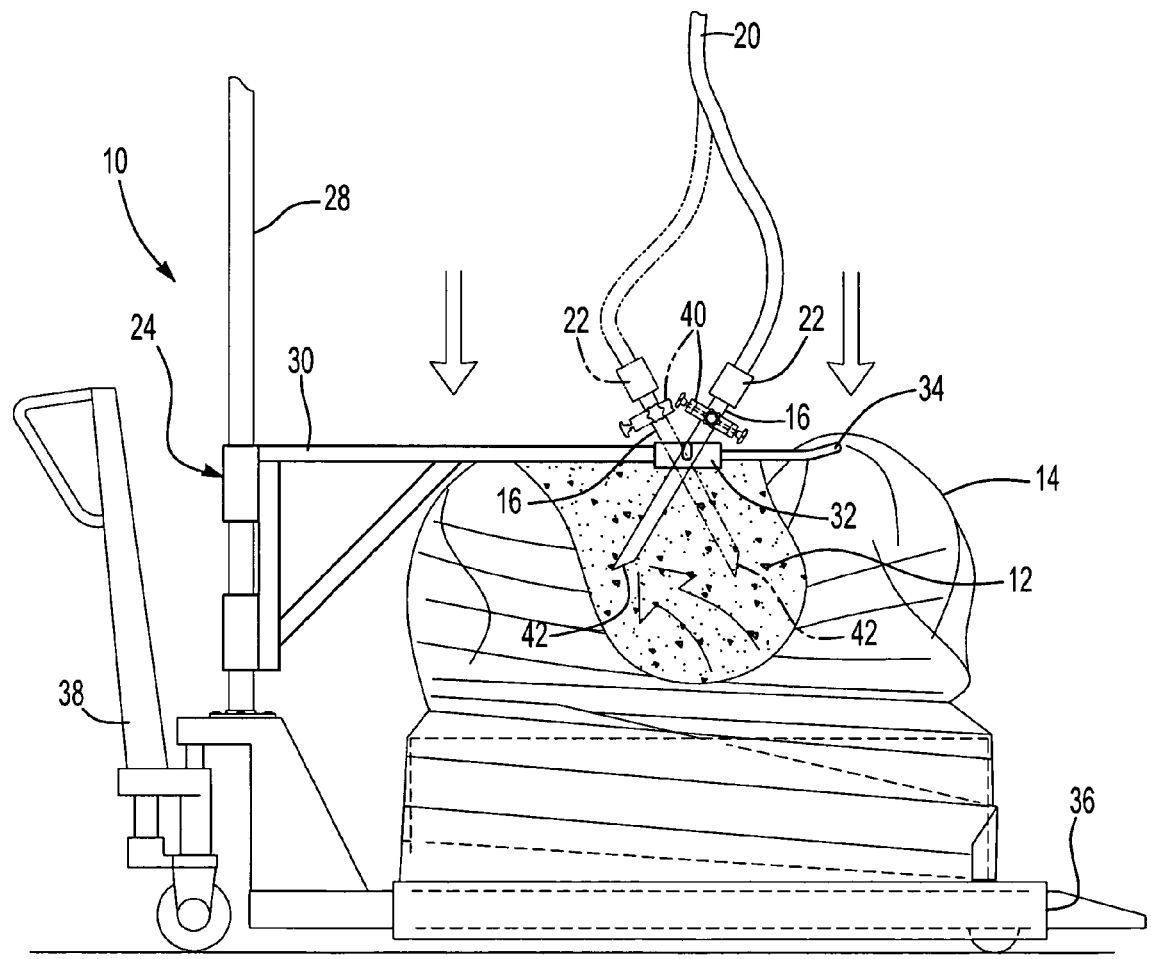
FIG. 5 is a side view of the alternate embodiment of FIG. 4 having the wand pivoting relative to the supporting structure to extract the product from the container.

The supporting structure 24 further includes at least one prong 34 extending outwardly therefrom for guiding the container 14 as the wand 16 extends therein and as the product 12 is extracted. The prongs 34 extend upwardly, i.e., are bent upwards, from the supporting structure 24 to facilitate the guiding of the container 14 over or around the supporting structure 24. The prongs 34 are best shown in FIGS. 6 and 7. In FIG. 5, a majority of the product 12 has been extracted and the container 14 has been looped about the prongs 34. Near the bottom of the container 14, the wand 16 may need to be reciprocated, or pivoted, to extract all of the product 12.

Figure 4:
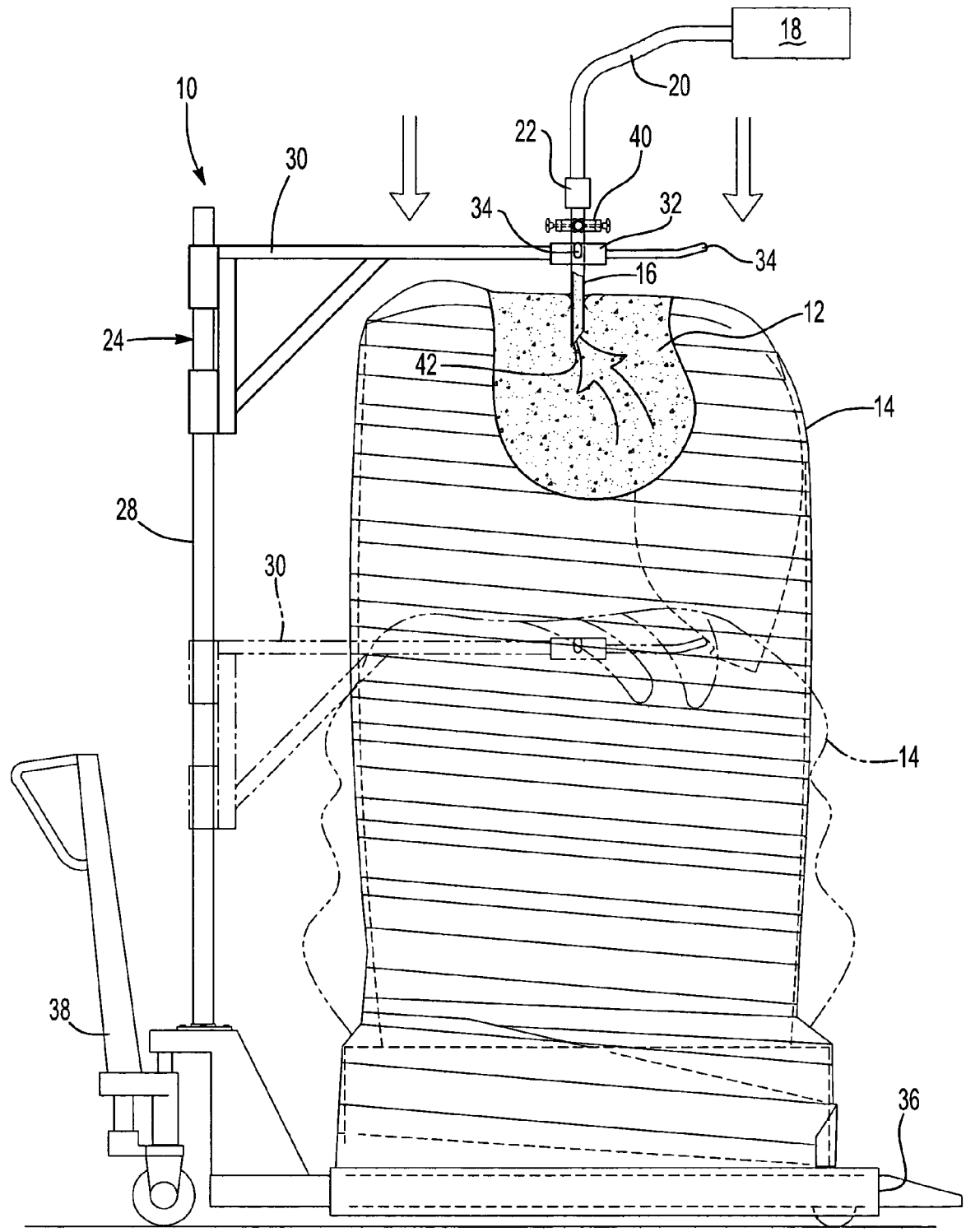
FIG. 4 is a side view of an alternate embodiment of the assembly having the supporting structure mounted to a stand which is mounted to a pallet jack for receiving a pallet having the container thereon.

The embodiment illustrated in FIG. 4 is particularly useful for engaging a pallet 36 that supports the container 14. The supporting structure 24 is mounted to a pallet jack 38 such that when the pallet jack 38 engages the pallet 36, the wand 16 is positioned near the container 14 to facilitate removal of the product 12. In this manner, the assembly 10 would be transportable to move among many containers 14 in various locations. Alternatively, the assembly 10 may be a stand-alone unit such that the pallets 36 would be brought to the unit for extraction. As shown in FIG. 6, the stand 26 may be mounted to a support 27 above the support structure 24.

In each of the embodiments discussed above, the wand 16 engages the supporting structure 24 to prevent the wand 16 from moving independently of the supporting structure 24 in the vertical direction towards the bottom of the container 14. This prevents the wand 16 from being drawn to the bottom of the container 14 and causing the container 14 to collapse as discussed above. However, as the wand 16 extracts the product 12 and the container 14 collapses, it may be necessary to maneuver the wand 16 into the corners or edges of the container 14. Therefore, the wand 16 may be pivotable relative to the supporting structure 24 to allow the wand 16 to pivot within the container 14, while remaining supported by the supporting structure 24. Alternatively, the wand 16 and the supporting structure 24 could be pivoted in unison. It should be appreciated that the wand 16 may be removed from the supporting structure 24 to reach the corners. Referring back to FIG. 2, the wand 16 and the supporting structure 24 is illustrated as being tilted to reach the product 12 remaining in the container 14. Whereas, in FIG. 5, the wand 16 is shown pivoted independent of the supporting structure 24.

The wand 16 also includes a collar 40 mounted thereto and engaging the supporting structure 24 to limit independent movement of the wand 16 in the vertical downward direction. The collar 40 may be fixed or screwed to the wand 16. The collar 40 illustrated in FIG. 6 has thumb screws 41 for securing the collar 40 to the wand 16. The wand 16 in the preferred embodiment is coupled to the collar 40 so that the supporting structure 24, the collar 40, and the wand 16 are a single unit coupled to the vacuum source 18. As discussed above, it should be appreciated by those of ordinary skill in this art that the wand 16 could be permitted to reciprocate within the collar 40 and even be angled within the collar 40, if desired. Preferably, the collar 40 is slideably mounted to the wand 16 for allowing the collar 40 to travel along the wand 16 and to adjust the amount that the wand 16 extends beyond the supporting structure 24 and into the container 14. Referring to FIG. 7, the collar 40 is illustrated as being secured to the wand 16 and as being slightly larger than the hoop 32 of the supporting structure 24. Since the collar 40 is larger, this prevents the wand 16 from being drawn into the container 14, but the wand 16 can still be reciprocated within the hoop 32 and move vertically upwards.

In use, the container 14 is positioned near the machinery into which the product 12 is to be transferred. The wand 16 is then inserted into the top of the container 14. In the preferred embodiment, the wand 16 has a pointed tip 42 to facilitate puncturing of the container 14. Many ways to insert the wand 16 should be apparent to those of ordinary skill in the art. For example, the top of the container 14 could be slit with a knife; the top could be opened by removing some of the wrap or in the case of other containers 14, such as the "Super Sac", by untying the top so that the wand 16 can be inserted.

Once inserted, the vacuum is applied to the wand 16 to extract the product 12 from the container 14. The supporting structure 24 engages the top of the container 14 as the container 14 is being emptied which holds the wand 16 at the pre-determined level with respect to the contents. Since the vertical movement of the wand 16 is fixed with respect to supporting structure 24, the wand 16 will remain at the pre-determined distance from the top throughout the extraction process.

With respect to the phantom lines shown in FIG. 1, approximately one-half of the material has been extracted from container 14. As can be seen, the sidewalls of container 14 have begun to collapse, but the supporting structure 24 is still maintained near the top of the container 14. In this way, the supporting structure 24 is supported by the contents throughout the extraction process resulting in the desired controlled vertical collapse of the container 14. Referring to FIG. 5, when the container 14 collapses, it may be pulled above the prongs 34 to remain clear of the wand 16. This may be achieved either by an operator or automatically.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vacuum wand assembly for extracting a product from a container, said assembly comprising:
    a container storing a product;
    a wand for extending into said container and for withdrawing said product therefrom;
    a vacuum source connected to said wand for applying a vacuum to extract said product through said wand; and
    a supporting structure supporting said wand and moveable relative to said container for carrying said wand as said product is extracted from said container wherein said supporting structure further comprises at least one prong extending outwardly therefrom for guiding said container as said wand extends therein.

2. An assembly as set forth in claim 1 wherein said wand is fixed to said supporting structure to prevent said wand from moving independently of said supporting structure in a vertical direction.

3. An assembly as set forth in claim 2 wherein said wand is pivotable relative to said supporting structure to allow said wand to pivot within said container.

4. An assembly as set forth in claim 1 wherein said supporting structure is supported on said container.

5. An assembly as set forth in claim 1 wherein said container is further defined as a non-self supporting container that collapses as said product is extracted.

6. An assembly as set forth in claim 1 further comprising a collar mounted to said wand and engaging said supporting structure to prevent independent movement of said wand in a vertical direction.

7. An assembly as set forth in claim 6 wherein said collar is further defined as being slideably mounted to said wand for allowing said collar to travel along said wand.

8. An assembly as set forth in claim 1 wherein said wand further comprises a pointed tip for piercing said container.

9. An assembly as set forth in claim 1 further comprising a stand located adjacent said container for supporting said supporting structure.

10. An assembly as set forth in claim 9 wherein said supporting structure slideably engages said stand for moving in a vertical direction as said product is extracted.

11. An assembly as set forth in claim 10 wherein said stand is further defined as a rod.

12. An assembly as set forth in claim 9 wherein said stand engages a pallet jack for supporting said supporting structure relative to said container.

13. An assembly as set forth in claim 1 wherein said prongs extend upwardly from said supporting structure.

14. An assembly as set forth in claim 1 wherein said supporting structure further includes an arm having a hoop larger than said wand for receiving said wand.

15. An assembly as set forth in claim 1 further comprising a flexible hose disposed between said wand and said vacuum source.

16. A vacuum wand assembly for extracting a product from a container, said assembly comprising:
    a container storing a product;
    a wand for extending into said container and for withdrawing said product therefrom;
    a vacuum source connected to said wand for applying a vacuum to extract said product through said wand; and
    a supporting structure supporting said wand and moveable relative to said container for carrying said wand as said product is extracted from said container wherein said supporting structure is a grid.

17. An assembly as set forth in claim 16 wherein said wand is fixed to said supporting structure to prevent said wand from moving independently of said supporting structure in a vertical direction.

18. An assembly as set forth in claim 17 wherein said wand is pivotable relative to said supporting structure to allow said wand to pivot within said container.

19. An assembly as set forth in claim 16 wherein said supporting structure is supported on said container.

20. An assembly as set forth in claim 16 wherein said container is further defined as a non-self supporting container that collapses as said product is extracted.

21. An assembly as set forth in claim 16 further comprising a collar mounted to said wand and engaging said supporting structure to prevent independent movement of said wand in a vertical direction.

22. An assembly as set forth in claim 21 wherein said collar is further defined as being slideably mounted to said wand for allowing said collar to travel along said wand.

23. An assembly as set forth in claim 16 wherein said wand further comprises a pointed tip for piercing said container.

24. An assembly as set forth in claim 16 further comprising a flexible hose disposed between said wand and said vacuum source.

* * * * *